(12) United States Patent
Kerbiriou et al.

(10) Patent No.: US 8,837,815 B2
(45) Date of Patent: Sep. 16, 2014

(54) METHOD OF FILTERING A DISPARITY MESH OBTAINED FROM PIXEL IMAGES

(75) Inventors: Paul Kerbiriou, Cesson Sevigne (FR); Guillaume Boisson, Cesson Sevigne (FR); Thierry Viellard, Cesson Sevigne (FR)

(73) Assignee: Thomson Licensing, Issy les Moulineaux (FR)

( * ) Notice: Subject to any disclaimer, the term of this patent is extended or adjusted under 35 U.S.C. 154(b) by 235 days.

(21) Appl. No.: 13/442,328

(22) Filed: Apr. 9, 2012

(65) Prior Publication Data
US 2013/0156295 A1 Jun. 20, 2013

(30) Foreign Application Priority Data
Dec. 14, 2011 (EP) .................................... 11306654

(51) Int. Cl.
*G06K 9/00* (2006.01)
(52) U.S. Cl.
USPC ................................ 382/154; 348/42; 348/51
(58) Field of Classification Search
CPC .................. G06T 7/0075; G06T 15/00; G06T 2207/10012; H04N 13/04; H04N 13/0239; H04N 13/026; H04N 13/0221; H04N 13/027; H04N 13/0282

USPC .......................................... 382/154; 348/42, 51
See application file for complete search history.

(56) References Cited

U.S. PATENT DOCUMENTS

| 6,377,865 B1* | 4/2002 | Edelsbrunner et al. .......... 700/98 |
| 7,023,432 B2* | 4/2006 | Fletcher et al. ................ 345/419 |
| 2010/0277571 A1* | 11/2010 | Xu et al. .......................... 348/47 |

OTHER PUBLICATIONS

Xudong et al "A Kind of Filtering Algorithms for Lidar Intensity Image Based on Flatness Terrain", School of Remote Sensing and information Engineering, China, Jan. 2005.

* cited by examiner

*Primary Examiner* — Samir Ahmed
(74) *Attorney, Agent, or Firm* — Tutunjian & Bitetto, P.C.

(57) ABSTRACT

A method of filtering a disparity mesh from pixel images according to the invention, where the disparity mesh comprises a plurality of points, where each point is associated with values of two planar coordinates (X, Y) and a disparity value (D) and where the values are quantization pitches, comprises the step: filtering planes by filtering 2D-lines in 2D-spaces (X-D, Y-D) of the planar coordinates (X,Y) and the disparity (D).

13 Claims, 6 Drawing Sheets

Fig. 1

Scanning countours

Computes slopes in XY plane · Determine direction

Searching candidates

METHOD OF FILTERING A DISPARITY MESH OBTAINED FROM PIXEL IMAGES

This application claims the benefit, under 35 U.S.C. §119 of EP Patent Application 11306654.2, filed 14 Dec. 2011.

1. SCOPE OF THE INVENTION

The invention concerns a method of filtering a disparity mesh obtained from pixel images.

2. PRIOR ART

A disparity mesh comprises a plurality of points, where each point is associated with values of two planar coordinates and with a disparity value. Generally, the planar coordinates indicate the position of the point within the images and the disparity value indicates a depth (or a height) of the corresponding point. The values of the planar coordinates and of the disparity value are quantization pitches, in particular, integers.

Such disparity meshes are e.g. elevation grids or disparity (depth) maps. An elevation grid is obtained from sensors which provides satellite, airplane, terrestrial or other pictures and videos.

A disparity map is obtained from a multiview video, such as from 3DTV or robot vision, with 2 and more cameras. As an example, a disparity map is generated by triangulation method when using a couple of sensors, e.g. video sensors with Z axis aligned.

A disparity mesh, namely an elevation map, is also obtained from a Lidar (light detection and ranging) intensity images. Lidar is a technology that allows measuring distances thanks to the return time, time of flight, of a pulsed light generated by a laser. Under certain conditions, there is a direct relation between disparity and depth elevation information generated by a Lidar, where the disparity corresponds to: focal_length*sensor_distance/depth.

Filtering a disparity mesh is used for (three-dimensional) 3D video production and 3D models.

A method of converting a physical object into a three-dimensional digital model (3D model) is described in U.S. Pat. No. 6,377,865 B1. The method acquires a set of measured data points on the surface of a physical model. From the measured data points, the method reconstructs a digital model of the physical object using a Delaunay complex of the points, a flow structure of the simplices in the Delaunay complex and retracting the Delaunay complex into a digital model of the physical object using the flow structure. The three-dimensional digital model is modified using a shape improvement method selected from: data relaxation by filtering out high surface frequencies, surfaces refinement by decomposing edges and triangles and surface thickening.

In the article of Lai Xudong et al., Chinese Journal of Lasers, October 2005, a kind of filtering algorithms for Lidar (light detection and ranging) intensity images based on flatness terrain is disclosed. According to the character of Lidar data, a fusion mean filtering algorithm based on the flatness of terrain is proposed.

When producing 3D videos or 3D models, it is often required to decrease the amount of information. Decreasing the amount of information of a disparity mesh, where the points are represented by quantization pitches, often causes additional steps or irregularities, mentioned as quantization noise.

It is therefore desirable to improve a method of filtering a disparity mesh in order to diminish quantization noise for further processing the data of the disparity mesh.

3. SUMMARY OF THE INVENTION

According to the invention this is achieved by the features of claim 1. Possible advantages embodiments are specified in the dependent claims.

A method of filtering a disparity mesh from pixel images according to the invention is described below, where the disparity mesh comprises a plurality of points, where each point is associated with values of two planar coordinates X, Y and a disparity D value and where the values are quantization pitches. The method comprises the step: filtering planes by filtering (two-dimensional) 2D-lines in 2D-spaces X-D, Y-D of the planar coordinates X, Y and the disparity D.

The step filtering planes diminishes aliasing on theoretically plane surfaces which occurs during images processing, in particular, during filtering and diminishing data amounts. Filtering 2D-planes by filtering 2D-lines, i.e. filtering lines in the 2D-spaces X-D, Y-D of the planar coordinates X, Y and the disparity D is an easy to perform and effective filtering method.

In addition, a method according to the invention which diminishes the amount of steps of quantization enables further processing of the data, e.g., in order to degrease the number of triangles. Filtering a disparity mesh according to invention is a precondition for transmission of the data of the disparity mesh with the goal to decrease the number of triangles.

In one embodiment of the invention, the step filtering planes comprises:
for 2D-lines in the 2D-spaces X-D,Y-D,
  detecting a 2D-line with at least two neighbour points,
    iterative, determining line points of the detected 2D-line and adapting the 2D-line, and
    modifying the line points to 2D-line locations of the 2D-line.

In one embodiment, a 2D-line with at least two neighbour points is detected if the 2D-line comply with a line equation in the 2D-space X-D or Y-D with parameters slope a and constant b:

$D=a*X+b, Y$=constant or $D=a*Y+b, X$=constant.

After a 2D-line with at least two line points, i.e. two neighbour points, is detected, one after another point next to a line point is examined. When an examined point is determined as a line point, i.e. it belongs to the 2D-line, the 2D-line is adapted to all line points including the new determined line point. If no further line point is found, the line points are modified to 2D-line locations.

In one embodiment, an examined point is determined as a line point of the 2D-line if an absolute difference of the disparity D between the examined point and a pre-determined line point is less than or equal to one quantization pitch and if its distance from the 2D-line is lower or equal to a threshold. The examination is mentioned as a test a priori. This threshold is also mentioned as first 2D-line threshold.

In one embodiment, a further examination is carried out, where an examined point is determined as a line point of the 2D-line if its distance from the 2D-line which is adapted including the examined point is lower or equal to a threshold. The examination is mentioned as a test a posteriori. This threshold is also mentioned as second 2D-line threshold. In one embodiment, the second 2D-line threshold corresponds to the first line threshold. In an alternative embodiment, the value of the second 2D-line threshold is smaller than that of the first 2D-line threshold.

In one embodiment of the invention, the 2D-line is defined with a normalized direction vector V which is the normalized Eigen vector of the covariance matrix COV of the line points with the greatest Eigen value and a gravity centre M of the line points.

The 2D-line is adapted to all line points, e.g. to include a new determined line point, by determining its parameters of the normalized direction vector V and of the gravity centre M again where the values of the new determined line point are incorporated. In addition, the slope a and the constant b are also determined again.

In one embodiment, a line point is modified to a 2D-line location of the 2D-line by projecting the line point onto the 2D-line.

In one embodiment, a line point I is projected onto the 2D-line, and thereby modified to a 2D-line location I', by computing the scalar product S of the vector MI from the gravity centre M of the line points to the line point I with the normalized direction vector V of the 2D-line and adding to the gravity centre M the normalized direction vector V multiplied by the scalar product S. Thus, if no further line point is found, the line points are modified to 2D-line locations.

In one embodiment, the method comprises the step:
filtering contours in the (three dimensional) 3D-space X-Y-D before filtering planes.

By filtering contours before filtering planes, aliasing of contours is diminished and the filtering of planes is improved.

In one embodiment of the invention, the step filtering contours comprises:
detecting contour points of contours,
iterative, determining contour points to segment points of a 3D-line segment of a 3D-line and adapting the 3D-line, and,
modifying the segment points to 3D-line points of the 3D-line.

After contour points are detected, they are examined if they belong to a 3D-line segment of a 3D-line. When a contour point is determined as a segment point the corresponding 3D-line is adapted to all segment points including the new determined segment point. If no further segment point is found, the segment points are modified to 3D-line points.

In one embodiment of the invention, an examined point is detected as a contour point if an absolute difference of the disparity D between the examined point and a surrounding point is greater than one quantization pitch.

In one embodiment of the invention, a contour point is determined as a segment point of the 3D-line segment of the 3D-line, if an absolute difference of the disparity D between the contour point and a pre-determined segment point is less than or equal to one quantization pitch and if its distance from the 3D-line is lower or equal to a threshold. This threshold is also mentioned as a 3D-line threshold.

In one embodiment of the invention, the 3D-line is defined with a normalized direction vector V which is the normalized Eigen vector of the covariance matrix COV of the segment points with the greatest Eigen value and a gravity centre M of the segment points.

The 3D-line is adapted to all segment points, e.g. to include a new determined segment point, by determining its parameters of the normalized direction vector V and of the gravity centre M again where the values of the new determined segment point are incorporated.

In one embodiment of the invention, segment point G is modified to a 3D-point P of the 3D-line by projecting the segment point G onto the 3D-line.

In one embodiment of the invention, a segment point G is projected onto the 3D-line by computing the scalar product S between the vector MG from a gravity centre M to the segment point G and the normalized direction vector V of the 3D-line and adding to the gravity centre M the normalized direction vector V multiplied by the scalar product S.

The invention will be explained in more detail using exemplary embodiments and the following figures.

4. LIST OF FIGURES

The invention will be better understood, and other specific features and advantages will emerge upon reading the following description, the description making reference to the annexed drawings wherein.

5. DETAILED DESCRIPTION OF THE INVENTION

The invention concerns a method of filtering a disparity mesh obtained from pixel images. The disparity mesh comprises a plurality of points where each point is associated with values of two planar coordinates X, Y and a disparity value D, i.e. it corresponds to a pixel. The planar coordinates X, Y corresponds to e.g. the coordinates of two-dimensional view and the disparity value D e.g. to a depth. The values are quantization pitches, e.g. integers.

According to one embodiment of the invention, the method of filtering the disparity mesh comprises two steps: filtering contours and filtering planes, where the filtering contours is carried out before the filtering planes.

The step filtering contours which is executed in the (three-dimension) 3D-space X-Y-D comprises: detecting contour points of contours, iterative, determining contour points to segment points of a 3D-line segment of a 3D-line and adapting the 3D-line, and modifying segment points to 3D-line points of the 3D-line.

Figure 1:
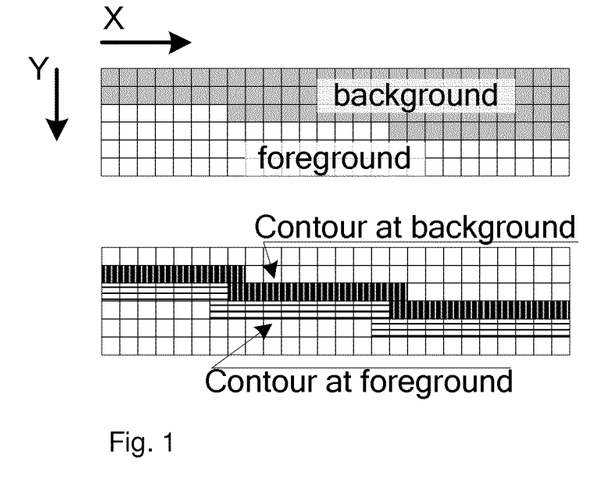
FIG. 1 shows a schematic diagram illustrating detecting contour points of step filtering contours.

In order to detect contour points of contours of objects, a contour map on D with marked contour points is created. An examined point is detected as a contour point if an absolute difference of the disparity D between the examined point and a surrounding point is greater than one quantization pitch, i.e. that the absolute difference amounts at least two quantization pitches. In particular, for each examined point with certain values of its X- and Y-coordinates and with a certain disparity D value, the disparity D value of each of the eight surrounding point are compared with its disparity D value. If the absolute difference D between the value of the examined point and of at least one surrounding point is greater than the quantization pitch, the examined point is detected as a contour point. Then, the examined point is marked as a contour point. Detecting contour points is shown in FIG. 1 where, in the upper picture, e.g. points with a high disparity D are marked as background and points with a lower disparity D as foreground and where in the lower picture corresponding contours at background and at foreground are marked.

The detected contour points are examined if they build 3D-line segments, also mentioned as 3D-linear segments, of a 3D-line. A 3D-line is a line in the 3D-space X-Y-D of the X- and Y-coordinates and the disparity D. A contour point is determined as a segment point of the 3D-line segment of the 3D-line if an absolute difference of the disparity D between the contour point and a pre-determined segment point is less than or equal to one quantization pitch and if its distance from the 3D-line is lower or equal to a threshold. This threshold is also mentioned as a 3D-line threshold.

Figure 2:
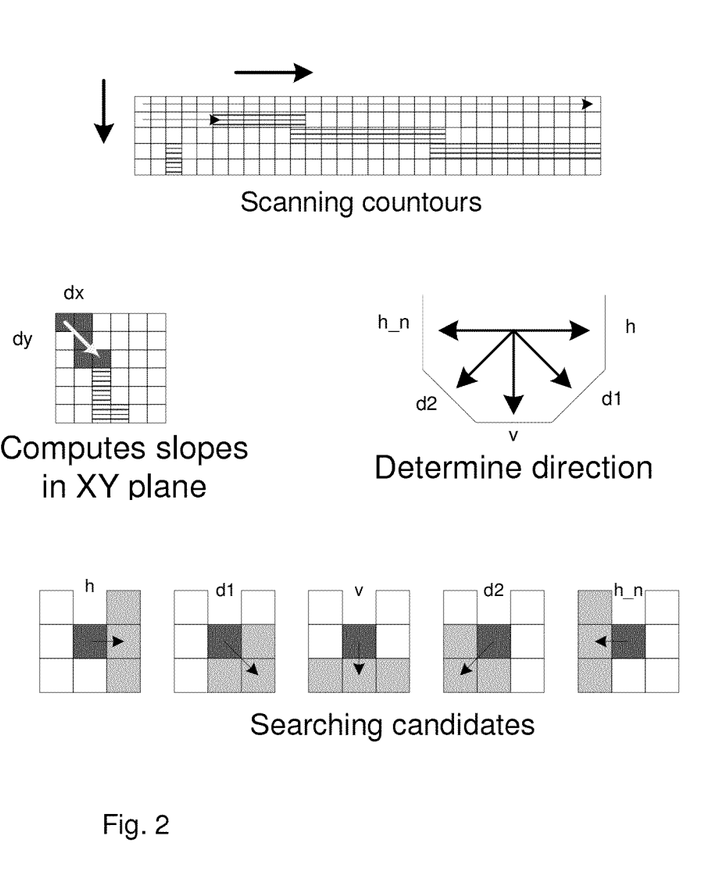
FIG. 2 shows a schematic diagram illustrating determining segment points of step filtering contours.

Determining contour points to segments points of a 3D-line segment which is schematically shown in FIG. 2 is performed e.g. as follows:

A contour map with the contour points is scanned in order to determine 3D-line segments. The first not processed contour point is chosen. Contour points next to the first chosen contour point and, if so, next to a pre-determined contour point are iterative examined.

If the absolute difference of the disparity D between the examined contour point and the first chosen contour point is less than or equal to one quantization pitch, it belongs to the same contour. The two contour points are determined as segment points of a 3D-line segment with the two points. A corresponding 3D-line extending through the segment points is calculated.

In the following, determining the first contour points to segment points is described in detail. The pixel image, i.e. the disparity mesh with the points, where some points are marked as contour points, is scanned from left to right and downward in order to find a first contour point of a 3D-line segment (see upper picture of FIG. 2). Then, the first immediate neighbour point of the first chosen contour point which is also a contour point is chosen as a second contour point of the 3D-line segment. With the two contour points the initial parameters of the 3D-line segment and with that of the corresponding 3D-line are calculated.

Then, contour points around a pre-determined segment point are examined. If the absolute difference of the disparity D between the examined contour point and the pre-determined segment point is less than or equal to one quantization pitch and if the distance of the examined point to the 3D-line is less than a 3D-line threshold, the examined contour point is determined as a next segment point. The corresponding 3D-line is adapted to extend through all determined segment points.

In particular, to search a next candidate of the contour points which can be incorporated into the 3D-line segment, the slope of the corresponding 3D-line in the X-Y space is used, i.e. only the variable X, Y are considered (see middle picture of FIG. 2).

The detected slope is classified into one of five possible directions: east (h), south-east (d1), south (v), south-west (d2) and west (h_n). When the direction of the 3D-line segment is determined, possible candidates which are shown in the lower picture of FIG. 2 as light grey point for each direction are examined. One or two points can be accepted if they are also contour points and depending on their distances to the 3D-line. I.e., one or two of neighbour contour points in the right direction are determined as segment points if their distances to the 3D-line are less than the 3D-line threshold.

If a point is determined as a segment point, its property of being a contour point is cleared so it can not be considered anymore.

When no further contour point around a pre-determined segment point can be determined as segment point of the mentioned 3D-line segment, the iteration stops. The 3D-line segment is mentioned as finished. The segment points are modified to 3D-line points, i.e. they are projected onto the 3D-line.

After a 3D-line segment is finished, a next 3D-line segment is searched. For searching the first point of a next 3D-line segment, the point just after (at right in FIG. 2) the first point of the pre-determined 3D-line segment is examined. If it is a contour point its neighbour point is examined and so on.

In order to evaluate parameters of a 3D-line a normalized direction vector V and a gravity centre M of the segment points of the 3D-line segment are computed. The normalized direction vector V is the normalized Eigen vector of the covariance matrix COV of the segment points associated with the greatest Eigen value. I.e. the 3D-line (Δ in FIG. 3) is defined with the normalized direction vector V and the gravity centre M of the segments points.

Figure 3:
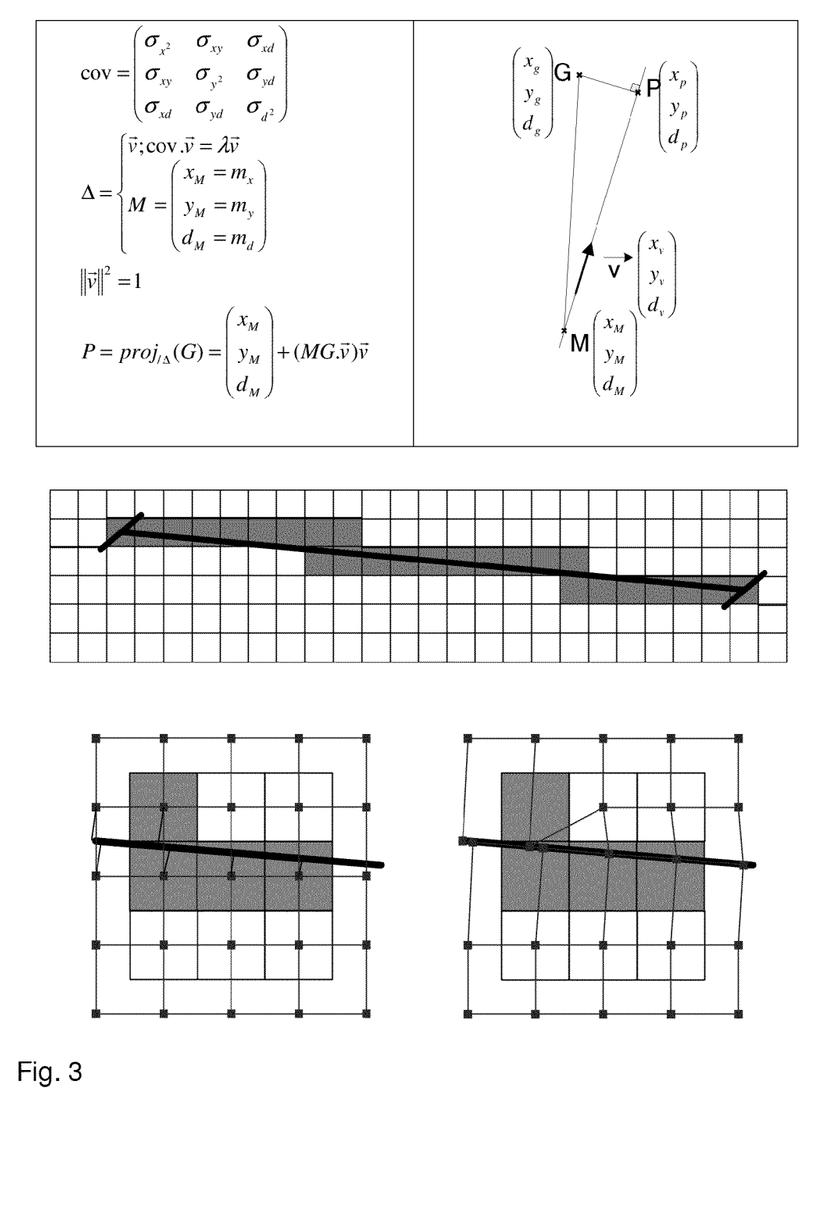
FIG. 3 shows parameters and a schematic diagram illustrating modifying segment points to 3D-line points of step filtering contours.

In particular, for a 3D-line with S segment points with values xi, yi and di, where i=1 to S, the values of the variables xM, yM and dM of the gravity centre M of the segment points and the variances $\sigma x^2$, ... and covariances $\sigma xy$, $\sigma xd$ ... the covariance matrix COV of the segment points are calculated from values of variables X, Y and D of the segment points as following:

$xM=mx=\mathrm{Sum}(xi)/S$ $yM=my=\mathrm{Sum}(yi)/S$ $dM=my=\mathrm{Sum}(di)/S$ $\sigma x^2=\mathrm{Sum}[(x_i-mx)^2]/(S-1)$ $\sigma y^2=\mathrm{Sum}[(y_i-my)^2]/(S-1)$ $\sigma d^2=\mathrm{Sum}[(d_i-md)^2]/(S-1)$ $\sigma xy=\mathrm{Sum}[(x_i-mx)(y_i-my)]/(S-1)$ $\sigma xd=\mathrm{Sum}[(x_i-mx)(d_i-md)]/(S-1)$ $\sigma yd=\mathrm{Sum}[(y_i-my)(d_i-md)]/(S-1).$ In order to project a segment point G with values xg, yg and dg of its variables X, Y and D onto the 3D-line, the values xp, yp and dp of its projected point P, i.e. its 3D-line point P, are computed as a sum of the values of the gravity centre M and values of the normalized direction vector V multiplied with a scalar product S of the vector MG from the gravity centre M to the segment point G and the normalized direction vector V of the determined 3D-line. I.e. a segment point G is modified to a 3D-line point P by adding to the gravity centre M the normalized direction vector V multiplied with the a.m. scalar product S.

The formulas, mentioned above, are shown in the pictures at the top of FIG. 3. The pictures on the bottom of FIG. 3 illustrate determining segment points of a 3D-line segment and projecting them onto the corresponding 3D-line. I.e. the segment points are modified to 3D-line points.

By modifying the segment points to 3D-line points, the values of their variables X, Y, D are modified, i.e. the position of the original points are displaced. The mesh, also mentioned as grid, is no more regular in X, Y plane. However the connectivity, which is e.g. their rank in the grid, remains the same.

Figure 4:
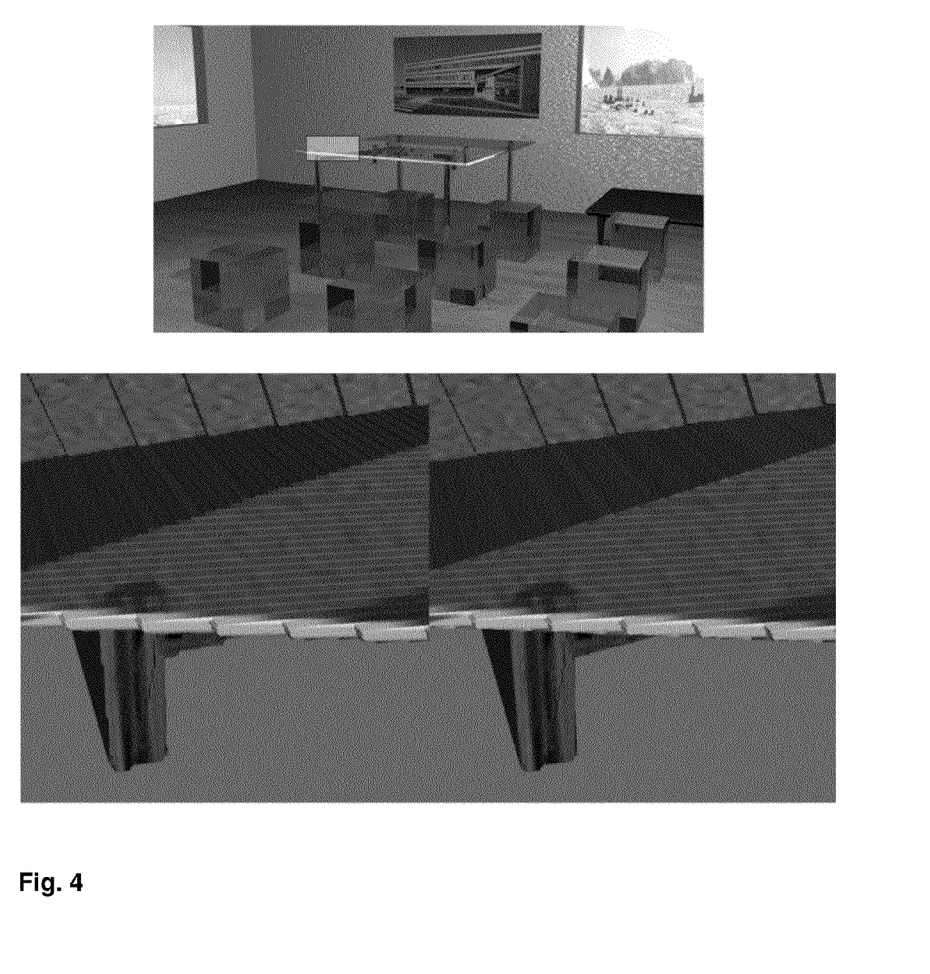
FIG. 4 shows an overall picture and two partial pictures, where the left partial picture is not filtered and the right partial picture is filtered by filtering contours.

FIG. 4 shows an example of this step filtering contours using two partial pictures with a silhouette of a table which is depicted in the overall picture. The background is the wall. In particular, the contour beneath the table shows aliasing effects in the left, not filtered partial picture. The contours of the right, filtered partial picture are straightened.

Figure 5:
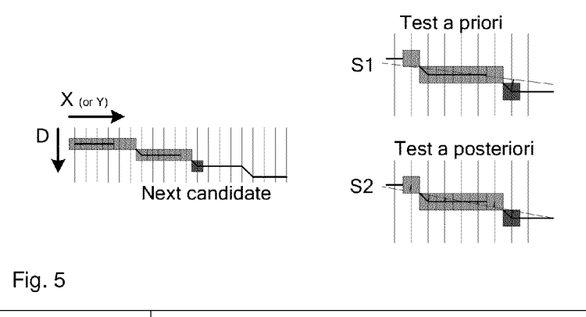
FIG. 5 shows a schematic diagram illustrating determining plane points of step filtering planes.
Figure 6:
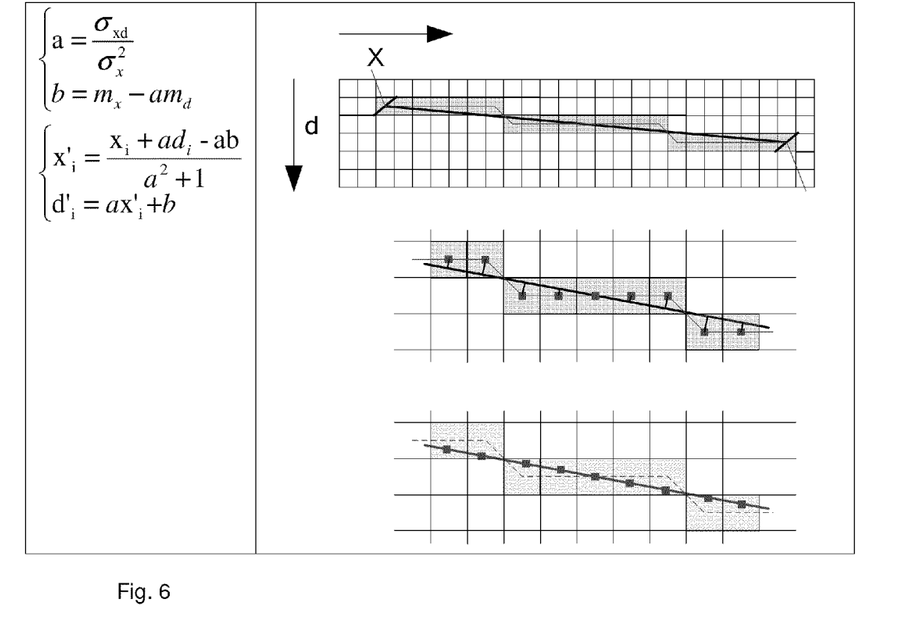
FIG. 6 shows parameters and a schematic diagram illustrating modifying line points to 2D-line locations of step filtering planes.

The step filtering planes is performed by filtering 2D-lines in 2D-spaces X-D, Y-D of the planar coordinates X, Y and the disparity D. It is shown in FIGS. 5 and 6 and comprises: for (two-dimensional) 2D-lines in the 2D-spaces X-D, Y-D: detecting a 2D-line in 2D-spaces X-D, Y-D with at least two neighbour points, iterative, determining line points of the detected 2D-line and adapting the 2D-line, and modifying the line points to 2D-line locations of the 2D-line.

A 2D-line in 2D-spaces X-D and Y-D is searched by choosing a start point and a neighbour point in one of the 2D-spaces X-D, Y-D. A 2D-line is detected, if at least these two neighbour points of the disparity mesh belong to a line equation $$D=a*Y+b,$$

where the value of X is constant, or $$D=a*X+b,$$

where the value of Y is constant.

The parameters of the equations are a slope a and a constant b.

As the coordinates X and Y and the disparity D are orthogonal, if points belong to a plane in this 3D-space, these points belong to a 2D-line in the 2D-space X-D, where Y is constant, or in the 2D-space Y-D, where X is constant. Therefore all 2D-lines fulfilling the above mentioned line equation, i.e. all points belonging to those 2D-lines, are searched.

The slope a of the line equation is defined with the relation between the covariance $\sigma xd$, $\sigma yd$ of the planar coordinate X, Y and the disparity D of the line points and the variance $\sigma x^2$, $\sigma y^2$ of the planar coordinate X, Y of the line points (see FIG. 6):

$$a=\sigma xd/\sigma x^2 \text{ or}$$

$$a=\sigma yd/\sigma y^2.$$

The constant b is defined with the slope a and a gravity centre M of the line points, which has the values mx and md or my and md, in an equation:

$$b=mx-a*md \text{ or}$$

$$b=my-a*md.$$

In particular, for a 2D-line with N line points (xi, di) or (yi, di), where i=1 to N, the a.m. parameters are calculated as following:

$$mx=\text{Sum}(x_i)/N \text{ or}$$

$$my=\text{Sum}(y_i)/N \text{ and}$$

$$md=\text{Sum}(d_i)/N,$$

$$\sigma xd=\text{Sum}[(x_i-mx)(d_i-md)]/(N-1) \text{ or}$$

$$\sigma yd=\text{Sum}[(y_i-my)(d_i-md)]/(N-1) \text{ and}$$

$$\sigma x^2=\text{Sum}[(x_i-mx)^2]/(N-1) \text{ or}$$

$$\sigma y^2=\text{Sum}[(y_i-my)^2]/(N-1).$$

For each detected 2D-line, an iterative process is performed (see FIG. 5, left side): An examined neighbour point is determined as a line point belonging to the 2D-line if an absolute difference of the disparity D between the examined point and a pre-determined line point is less than or equal to one quantization pitch and if its distance from the 2D-line is lower or equal to a threshold. The 2D-line is adapted extending through the line points.

In one embodiment, the examination if a neighbour point belongs to the 2D-line is made twice. In a first examination, mentioned as test a priori, an examined point is accepted as a line point if its distance from the 2D-line adapted to the line points without the examined point is lower or equal to a threshold. The threshold is mentioned as a first 2D-line threshold. In a following examination, mentioned as test a posteriori, an examined point is accepted as a line point if its distance from the 2D-line adapted to the line points with the examined point is lower or equal to a threshold. This threshold is mentioned as a second 2D-line. In one embodiment, the thresholds have the same value. The tests are depicted in FIG. 5 on the right side.

In order to evaluate parameters of a 2D-line a normalized direction vector V and a gravity centre M of the line points are calculated. The normalized direction vector V is the normalized Eigen vector of the covariance matrix COV of the line points with the greatest Eigen value and a gravity centre M of the line points. The calculation of the values mx, md or my, md of the gravity centre M and the covariance $\sigma xd$ or $\sigma xy$ and the variance $\sigma x^2$ or $\sigma y^2$ of the covariance matrix COV is described above.

If no further neighbour point of the line points along a 2D-line can be determined as a line point, the iteration stops. The line points are modified to 2D-line locations of the 2D-line, i.e. they are projected onto the 2D-line.

In order to project a line point I with values xi, di or yi, di of its variables X, D or Y, D onto the 2D-line, the values xi', di' or yi', di' of its projected point I' are computed as a sum of the values of the gravity centre M and values of a scalar product S of the vector MI from the gravity centre to the line point I and the normalized direction vector V of the 2D-line. I.e. a line point I is modified to a 2D-line location I' by adding to the gravity centre M the normalized direction vector multiplied with the a.m. scalar product S.

The normalized direction vector V is also calculated with the slope a of the line equation:

$$V=(1/\text{sqrt}(1+a^2),a/\text{sqrt}(1+a^2)).$$

Further, for a line point I (xi, di), the a.m. parameters are:

$$MI=(xi-mx,di-md),$$

$$S=I*MI=xi*(xi-mx)+di*(di-md),$$

$$I'=I+S*V=(mx+S/\text{sqrt}(1+a^2),md+a*S/\text{sqrt}(1+a^2)).$$

In particular, a line point I with values xi and di is projected onto its 2D-line with the slope a and the constant b, where the value of the planar coordinate Y is constant, the values of its projected point I', i.e. the 2D-line location I', are computed as:

$$x'i = \frac{xi + a*di - a}{a^2 + 1} * b,$$

and $$d'i = a*x'i + b.$$

The formulas of the slope a and the constant b as well as the formulas of the 2D-line location I' are shown in the left picture of FIG. 6. The pictures on the right side of FIG. 6 illustrate determining points of the 2D-line and projecting them onto the corresponding 2D-line. I.e. the line points are modified to 2D-line locations.

Figure 7:
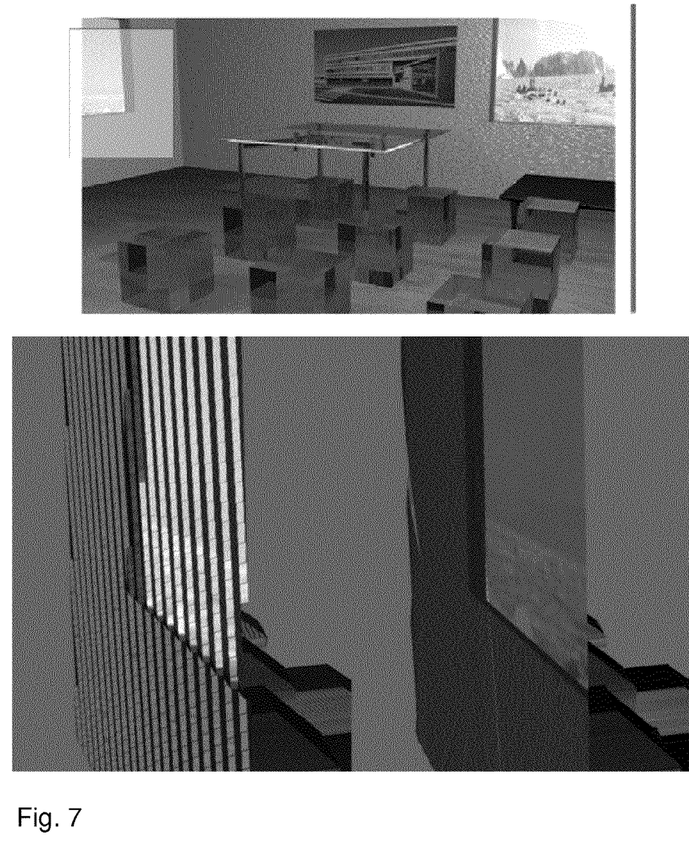
FIG. 7 shows the overall picture of FIG. 4 and two other partial pictures, where the left partial picture is not filtered and the right partial picture is filtered by filtering contours and planes.

FIG. 7 shows a left partial picture which is not filtered and a right partial picture which is filtered in two steps: filtering contours and filtering planes. The left partial picture demonstrate aliasing steps at contours and planes, while on the filtered picture of the right side, the contours are more straight and the planes are more flat.

Figure 8:
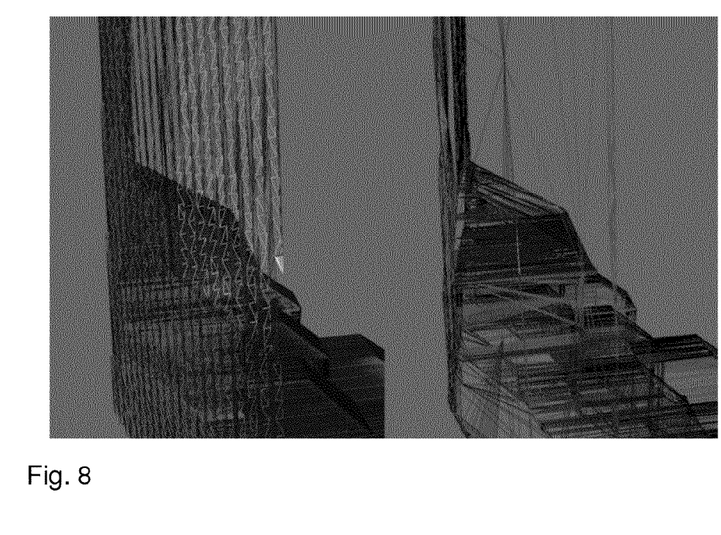
FIG. 8 shows the two partial picture of FIG. 7 after decimation.
Figure 9:
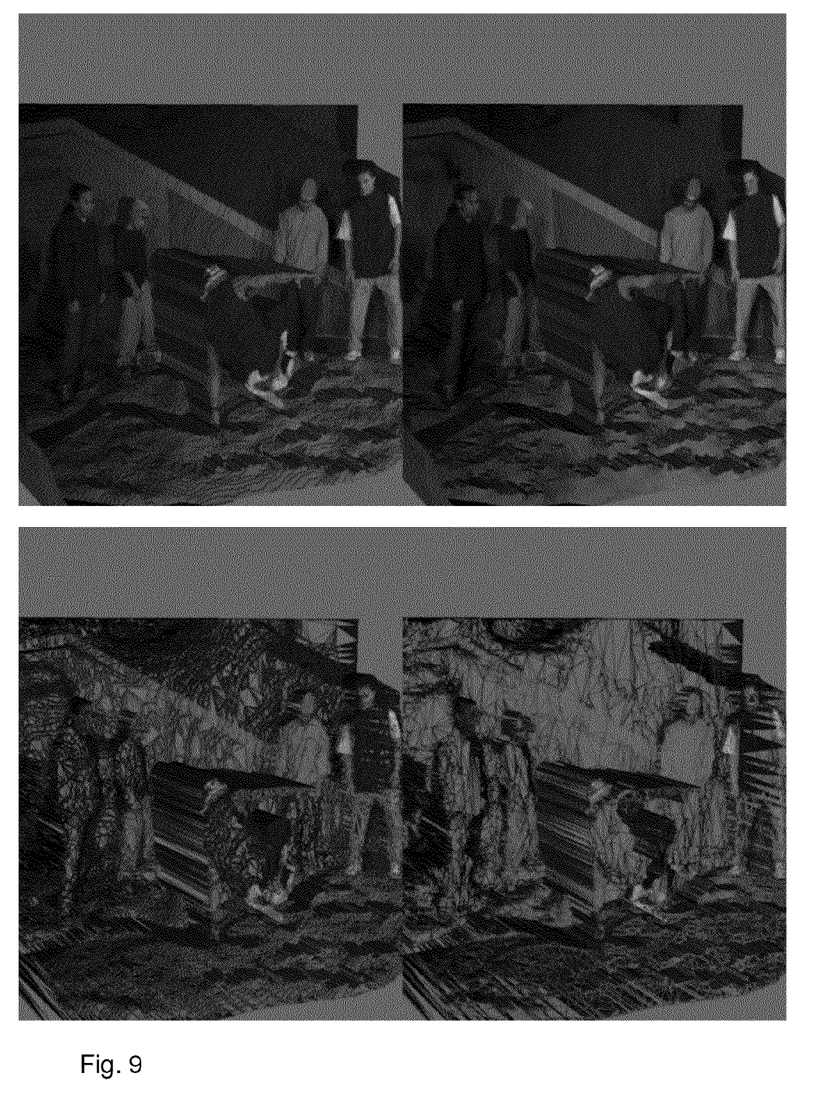
FIG. 9 shows a natural scene with four pictures, where, at the top, the left picture is not filtered and the right picture is filtered by filtering contours and planes and, on the bottom, the both pictures are after a VTK-decimation.

The effect of this filtering after diminishing the amount of data is shown in FIGS. 8 and 9. FIG. 8 depicts the two partial pictures of FIG. 7, without and with filtering, after diminishing and demonstrates that the decimation is around 3 times more efficient after the filtering (contours and planes) according to the invention:

The depth image is 960×540 points, the texture image is 960×540 pixels:

Before decimation
   518400 points.
   1033802 triangles.
After decimation on original mesh
   19358 points.
   35718 triangles.
After decimation on filtered mesh
   6668 points.
   10338 polygons.

In FIG. 9 the filtering or not and diminishing with a VTK-software (VTK Decimate Pro method) is demonstrated with the help of another picture, namely a natural scene: The performance of the decimation is equally around 3 times more efficient after the filtering according to the invention.

In another embodiment of the invention only the step filtering planes by filtering 2D-lines in 2D-spaces X-D, Y-D of the planar coordinates X, Y and the disparity D is worked out. This embodiment is advantageously applied to disparity meshes with minor contour aliasing effects. As aliasing of contours is mainly due to pixel relative size, this could be the case when processing an HD image (with at least 2 Kbyte pixels wide) which is associated with disparity values D (or with similar values) and which has a low dynamic range, e.g. less than 256 quantization steps. In this case, the quantization on contours due to a quantization of the planar coordinates X and Y becomes neglectable versus the quantization of the disparity values D.

The invention claimed is:

1. Method of filtering a disparity mesh obtained from pixel images, the disparity mesh comprising a plurality of points, each point being associated with values of two planar coordinates and a disparity value, the values being quantization pitches, wherein the method comprises filtering planes by filtering 2D-lines in 2D-spaces of the planar coordinates and the disparity, said filtering being implemented by a processor and comprising, for the 2D-lines in the 2D-spaces:

detecting, by said processor, a 2D-line with at least two neighbour points,    iterative, determining, by said processor, line points of the detected 2D-line and adapting the 2D-line, an examined point being determined as a line point of the 2D-line if an absolute difference of the disparity between the examined point and a pre-determined line point is less than or equal to one quantization pitch and if its distance from the 2D-line is lower or equal to a threshold, and    modifying, by said processor, the line points to 2D-line locations of said 2D-line.

2. Method according to claim 1, wherein the 2D-line with at least two neighbour points is detected if the 2D-line with the at least two neighbour points comply a line equation with the parameters slope (a) and constant (b) in the 2D-space:

$$D = a*Y + b, X = \text{const or}$$

$$D = a*X + b, Y = \text{const.}$$

3. Method according to claim 1, wherein an examined point is determined as a line point of the 2D-line if its distance from the 2D-line, which is adapted including the examined point, is lower or equal to a threshold.

4. Method according to claim 1, wherein the 2D-line with line points is defined with a normalized direction vector which is the normalized Eigen vector of the covariance matrix of the line points with the greatest Eigen value and a gravity centre of the line points.

5. Method according to claim 1, wherein a line point is modified to a 2D-line location of the 2D-line by projecting the line point onto the 2D-line.

6. Method according to claim 5, wherein the line point is projected onto the 2D-line by computing the scalar product of the vector from the gravity centre of the line points to the line point with the normalized direction vector of the 2D-line and adding to the gravity centre the normalized direction vector multiplied by the scalar product.

7. Method according to claim 1, wherein the method comprises the step of:

filtering contours in a 3D-space filtering planes.

8. Method according to claim 7, wherein the step of filtering contours in the 3D-space comprises:

detecting contour points of contours, iterative, determining contour points to segment points of a 3D-line segment of a 3D-line and adapting the 3D-line, and,    modifying the segment points to 3D-line points of said 3D-line.

9. Method according to claim 8, wherein an examined point is detected as a contour point if an absolute difference of the disparity between the examined point and a surrounding point is greater than one quantization pitch.

10. Method according to claim 9, wherein a contour point is determined as a segment point of the 3D-line segment of the 3D-line if an absolute difference of the disparity between the contour point and a pre-determined segment point is less than or equal to one quantization pitch and if its distance from the 3D-line is lower or equal to a threshold.

11. Method according to claim 10, wherein the 3D-line is defined with a normalized direction vector which is the normalized Eigen vector of the covariance matrix of the segment points with the greatest Eigen value and a gravity centre of the segment points.

12. Method according to claim 11, wherein a segment point is modified to a 3D-line point of the 3D-line by projecting the segment point onto the 3D-line.

13. Method according to claim 12, wherein a segment point is projected onto the 3D-line by computing the scalar product between the vector from the gravity centre to the segment point and the normalized direction vector of the 3D-line and adding to the gravity centre the normalized direction vector multiplied by the scalar product.

* * * * *